(12) United States Patent
Smith

(10) Patent No.: US 11,495,964 B2
(45) Date of Patent: Nov. 8, 2022

(54) DUAL OUTPUT POWER SYSTEM FOR VEHICLES

(71) Applicant: UATC, LLC, San Francisco, CA (US)

(72) Inventor: Thomas Lawrence Smith, Rodeo, CA (US)

(73) Assignee: UATC, LLC, San Francisco, CA (US)

( * ) Notice: Subject to any disclaimer, the term of this patent is extended or adjusted under 35 U.S.C. 154(b) by 925 days.

(21) Appl. No.: 16/114,985

(22) Filed: Aug. 28, 2018

(65) Prior Publication Data

US 2019/0296546 A1    Sep. 26, 2019

Related U.S. Application Data

(60) Provisional application No. 62/646,604, filed on Mar. 22, 2018.

(51) Int. Cl.
| | |
|---|---|
| *H02J 1/12* | (2006.01) |
| *H02J 1/14* | (2006.01) |
| *H02M 3/04* | (2006.01) |
| *B60W 10/08* | (2006.01) |
| *H02J 1/08* | (2006.01) |
| *H02M 1/00* | (2006.01) |

(52) U.S. Cl.
CPC .............. *H02J 1/12* (2013.01); *B60W 10/08* (2013.01); *H02J 1/14* (2013.01); *H02M 3/04* (2013.01); *H02J 1/082* (2020.01); *H02M 1/008* (2021.05)

(58) Field of Classification Search
CPC ...... H02J 1/12; H02J 1/14; H02J 1/082; H02J 2310/46; B60W 10/08; H02M 3/04; H02M 1/008; Y02T 10/92; B60R 16/03
See application file for complete search history.

(56) References Cited

U.S. PATENT DOCUMENTS

| | | | |
|---|---|---|---|
| 2005/0029867 A1* | 2/2005 | Wood ........................ | H02J 1/14 307/66 |
| 2018/0050685 A1* | 2/2018 | Atluri ................. | B60W 10/026 |
| 2018/0120841 A1* | 5/2018 | Endo ...................... | B60W 10/08 |

* cited by examiner

*Primary Examiner* — Toan T Vu
(74) *Attorney, Agent, or Firm* — Schwegman Lundberg & Woessner, P.A.

(57) ABSTRACT

A vehicle that has electronic systems including an autonomous vehicle stack includes a dual output power system for powering the electronic systems of the vehicle. The power system includes a battery at a first voltage level for storing energy at the first voltage level, a dual output belt-driven starter generator that is started by a starter receiving power from the battery at the first voltage level and that provides dual outputs at a second voltage level for providing power to the electronics systems, at least one DC-DC converter that converts the dual outputs at the second voltage level to dual outputs at the first voltage level, and first and second power distributors that distribute power from the battery and DC-DC converter(s) to the electronic systems. The power systems may be configured to power safety critical components from respective power distributors and DC-DC converters at the respective voltage levels.

19 Claims, 4 Drawing Sheets

DUAL OUTPUT POWER SYSTEM FOR VEHICLES

CROSS-REFERENCE TO RELATED APPLICATIONS

The present application claims priority to U.S. Provisional Patent Application Ser. No. 62/646,604, filed Mar. 22, 2018. The content of that application is incorporated herein by reference in its entirety.

TECHNICAL FIELD

The disclosure herein is directed to a dual output power system for vehicles, and, more particularly, to a dual output power system for an autonomous or semi-autonomous non-electric, non-plug-in hybrid electric vehicle including an autonomous vehicle stack.

BACKGROUND

The demand for power in a vehicle, particularly non-electric and non-plug-in hybrid electric autonomous or semi-autonomous vehicles, is rapidly increasing. The ability to support power demands with a traditional belt-driven 12-Volt (V) generator and point-to-point wiring is becoming more difficult with each model year. To address this problem and to support the power demands of tomorrow's vehicles, it has been forecast that automakers will soon introduce 48-V output systems. With improved power transfer to and from the battery, it is envisioned that the 48-V system will enable new fuel saving technologies for hybrid vehicles. Moreover, a 48-V system is expected to facilitate a more efficient, lower current implementation of current 12-V output applications, including common features like heated windshields, heat and air conditioning systems, cooling fans, power steering, start-stop systems, and the like.

The hybrid vehicle industry has recently begun to deploy 48-V output systems. These systems include, for example, a 0.5 kilowatt-hour (kWh) lithium-ion battery and provide 6 to 20 kilowatts (kW) needed to meet the increased power demands of a variety of new vehicle efficiency-features as well as other customer features such as adaptive suspension systems and electric turbochargers. However, such systems have not been deployed in non-hybrid vehicle systems and have not been used in conjunction with conventional 12-V output systems.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

Since it is expected that 12-V output systems will remain for quite some time, there is a critical need for power systems that may simultaneously provide 12-V output and 48-V output, particularly in the case of autonomous or semi-autonomous vehicles having an autonomous vehicle (AV) stack as the 48-V systems can provide significantly higher power and lower currents. Example embodiments described below address these and other needs in the art.

In a first embodiment, the vehicle includes electronic systems including an AV stack and a dual output power system for powering the electronic systems of the vehicle. In sample embodiments, the dual output power system includes at least one battery at a first voltage level for storing energy at the first voltage level, a dual output belt-driven starter generator that is started by a starter receiving power from at the least one battery at the first voltage level and that provides dual outputs at a second voltage level for providing power at the second voltage level to the electronics systems, at least one direct current-to-direct current (DC-DC) converter that converts the dual outputs at the second voltage level to dual outputs at the first voltage level, and first and second power distributors that distribute power from the at least one battery and the at least one DC-DC converter to the electronic systems. In sample configurations, the first voltage level is a 12-V output and the second voltage level is a 48-V output. In other sample configurations, the dual outputs comprise alternators.

In other sample configurations, the first power distributor provides power to the AV stack and electronic accessories including at least one of power windows, power mirrors, air conditioning, immobilizer system, and central locking, while the second power distributor provides power to a steering system, a pneumatic valve pack used to control air brakes, and to the AV stack. The second power distributor further provides power to a power management unit that starts the dual output power system, sequences when circuits of the dual output power system should turn on, and starts up and operates power components of the AV stack. In sample embodiment, the safety critical components of the electronic systems receive redundant power at the first and second voltage levels.

In a second embodiment, the vehicle includes electronic systems including an AV stack and a dual output power system for powering the electronic systems of the vehicle. In sample embodiments, the dual output power system includes a first battery having a first voltage level provided on a first power rail, a second battery having a second voltage level provided on a second power rail, a belt-driven starter generator that is started by a starter receiving power from the first battery at the first voltage level and provides an output at the second voltage level for providing power at the second voltage level to the electronic systems, a first DC-DC converter that converts the output of the belt-driven starter generator to the first voltage level for powering the electronic systems of the vehicle, a second DC-DC converter that provides voltage conversion between the first and second power rails, a first power distributor that distributes power from the first power rail to the electronic systems, and a second power distributor that distributes power from the second power rail to the electronic systems. In this embodiment, the safety critical components of the electronic systems receive redundant power from the first power distributor and the first DC-DC converter to provide redundancy. The dual output power system may further include a power management unit that starts components of the dual output power system, sequences when the components are turned on, and shuts down the dual output power system. As in the first embodiment, the first voltage level may be a 12-V output and the second voltage level may be a 48-V output.

The disclosure provided herein further includes sample embodiments including methods of powering electronic systems of a vehicle including an AV stack. The methods include providing power from at least one battery at a first voltage level to a starter of a belt-driven starter generator, providing at least one output of the belt-driven starter generator at a second voltage level to the electronic systems, DC-DC converting, using at least one DC-DC converter, the at least one output at the second voltage level to at least one output at the first voltage level, and distributing power at the first voltage level from the at least one battery and the at least one DC-DC converter to the electronic systems. In the sample embodiments, the first voltage level is a 12-V output and the second voltage level is a 48-V output. In sample embodiments, the methods further include providing at least one output of the belt-driven starter generator to at least one alternator.

In other sample embodiments, distributing power at the first voltage level comprises a first power distributor providing power to the AV stack and to electronic accessories including at least one of power windows, power mirrors, air conditioning, immobilizer system, and central locking. Distributing power at the first voltage level also comprises a second power distributor providing power to a steering system, a pneumatic valve pack used to control air brakes, and to the AV stack and the second power distributor providing power to a power management unit that starts a power system for the vehicle, sequences when circuits of the power system should turn on, and starts up and operates power components of the AV stack. In the sample embodiments, redundant power is provided at the first and second voltage levels to safety critical components of the electronic systems.

In further sample embodiments, the methods further include providing power from the at least one battery at the first voltage level to a first power rail, providing power at the second voltage level to a second power rail, and DC-DC converting voltage between the first and second power rails. In addition, a first power distributor distributes power from the first power rail to the electronic systems and a second power distributor distributes power from the second power rail to the electronic systems, wherein safety critical components of the electronic systems receive redundant power from the first power rail and the second power rail.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
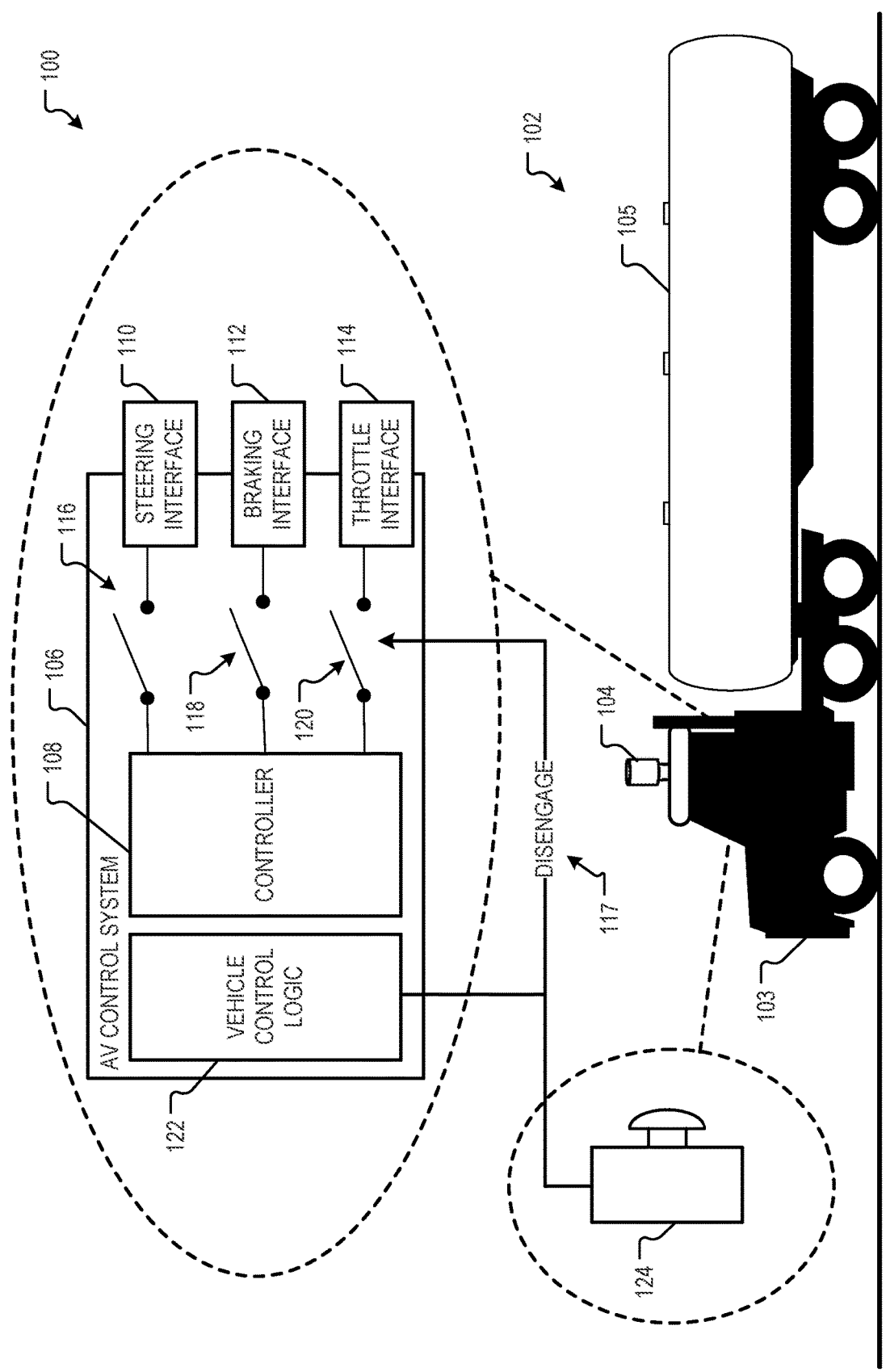
FIG. 1 is a diagram showing an environment with a vehicle including an AV control system in a sample embodiment.

It should be understood at the outset that although an illustrative implementation of one or more embodiments are provided below, the disclosed systems and/or methods described with respect to FIGS. 1-4 may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which is shown by way of illustration specific embodiments which may be practiced. These embodiments are described in sufficient detail to enable those skilled in the art to practice the systems and methods described herein, and it is to be understood that other embodiments may be utilized, and that structural, logical and electrical changes may be made without departing from the scope of the present disclosure. The following description of example embodiments is, therefore, not to be taken in a limited sense, and the scope of the present disclosure is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The embodiments described herein provide a dual output power system for vehicles. Examples described herein are directed to a dual output power system for an autonomous or semi-autonomous non-electric, non-Plug-in Electric Vehicle (PHEV) including an autonomous vehicle (AV) stack. However, it will be appreciated that other types of vehicles, including hybrid or non-hybrid electric vehicles or conventional internal combustion engine vehicles may have a need for a dual output power system as described herein.

In a first embodiment, 12-V and 48-V output systems are provided that may operate separately to provide higher voltage or power where needed. In a second embodiment, 12-V and 48-V output systems are provided in a configuration that provides redundancy in the event that one power system fails. In sample embodiments, the AV stack may be powered at 48-V for improved performance while the engine is started with the conventional 12-V system. Also, redundant power may be provided to safety critical components in an AV stack to prevent a dangerous power failure. As used herein, the AV stack may include any of a number of components that convert remote sensor inputs into vehicle control commands.

In this description, an overview of the autonomous or semi-autonomous vehicle first will be provided in order to provide context for the dual output power system in the sample embodiments.

Autonomous or Semi-Autonomous Vehicle

In an autonomous or semi-autonomous vehicle, an autonomous vehicle (AV) control system controls one or more of the braking, steering, or throttle of the vehicle. In a fully-autonomous vehicle, the AV control system assumes full control of the vehicle. In a semi-autonomous vehicle, the AV control system assumes a portion of the vehicle control, with a human user (e.g., a vehicle operator) still providing some control input.

FIG. 1 is a diagram showing one example of an environment 100 with a vehicle 102 including an AV control system 106. The dual output power system will be described herein in connection with vehicle 102 which, in some examples, is a self-driving vehicle (SDV) or autonomous vehicle (AV). However, it will be appreciated that the dual output power system described herein also may be used in conjunction with other types of vehicles using two power sources, such as a hybrid or non-hybrid vehicle or a conventional (i.e., non-autonomous) electric vehicle. In sample embodiments, the SDV or AV comprise a control system (e.g., FIG. 2) for operating the vehicle without human intervention. In some examples, the vehicle 102 also, in addition to or instead of a full autonomous mode, includes a semi-autonomous mode in which a human user is responsible for some or all control of the vehicle.

In the example of FIG. 1, the vehicle 102 is a tractor-trailer including a tractor 103 and a trailer 105. In various other examples, the vehicle 102 does not include a trailer and may be, for example, a dump truck, a bus, or any other similar vehicle. Also, in some examples, the vehicle 102 is a passenger vehicle.

The vehicle 102 has one or more remote-detection sensors 104 that receive return signals from the environment 100. Return signals may be reflected from objects in the environment 100, such as the ground, buildings, trees, etc. The remote-detection sensors 104 may include one or more active sensors, such as light detection and ranging (LIDAR), radio detection and ranging (RADAR), or sound navigation and ranging (SONAR) that emit sound or electromagnetic radiation in the form of light or radio waves to generate return signals. The remote-detection sensors 104 may also include one or more active sensors, such as cameras or other imaging sensors, proximity sensors, etc. Information about the environment 100 is extracted from the return signals. In some examples, the remote-detection sensors 104 include a passive sensor, such as a set of stereoscopic cameras, that receive reflected ambient light or other radiation.

The AV control system 106 includes vehicle control logic 122 that is configured to receive signals from the remote-detection sensors 104 and determine a set of vehicle actions. For example, the vehicle control logic may include a perception system, a prediction system, a motion planning system, and/or a pose system, described in more detail with respect to FIG. 2. The AV control system 106 also includes one or more controllers 108 that are electrically or otherwise connected to control interfaces 110, 112, 114 for various vehicle controls. A steering interface 110, for example, controls the steering input provided to the vehicle 102. A braking interface 112 controls the braking input provided to the vehicle 102. A throttle interface 114 controls the throttle control provided to the vehicle 102. The controller 108 receives one or more desired vehicle actions and translates the actions to a set of one or more control signals. Control signals are provided to control interfaces 110, 112, 114 to modify the respective controls.

Disengage switches 116, 118, 120 may be positioned between the controller 108 and the various control interfaces 110, 112, 114. Upon receiving a disengage signal 117, one or more of the disengage switches 116, 118, 120 are opened to disconnect the controller 108 from the various interfaces 110, 112, 114. This prevents the interfaces 110, 112, 114 from further controlling the steering, braking, or throttle, respectively, of the vehicle 102. Although one disengage signal 117 is shown in FIG. 1, in some examples separate disengage signals are provided to disengage different control interfaces 110, 112, 114. Those skilled in the art will also appreciate that software switches instead of hardware switches is also possible for use as the disengage switch.

The disengage signal 117 may be generated in any suitable manner. In some examples, a disengage button 124 is positioned in the tractor 103 where it can be actuated by the human user. The human user actuates the disengage button 124 to assume control of the vehicle 102. When actuated, the disengage button 124 generates the disengage signal 117 and/or causes the disengage signal 117 to be generated.

Figure 2:
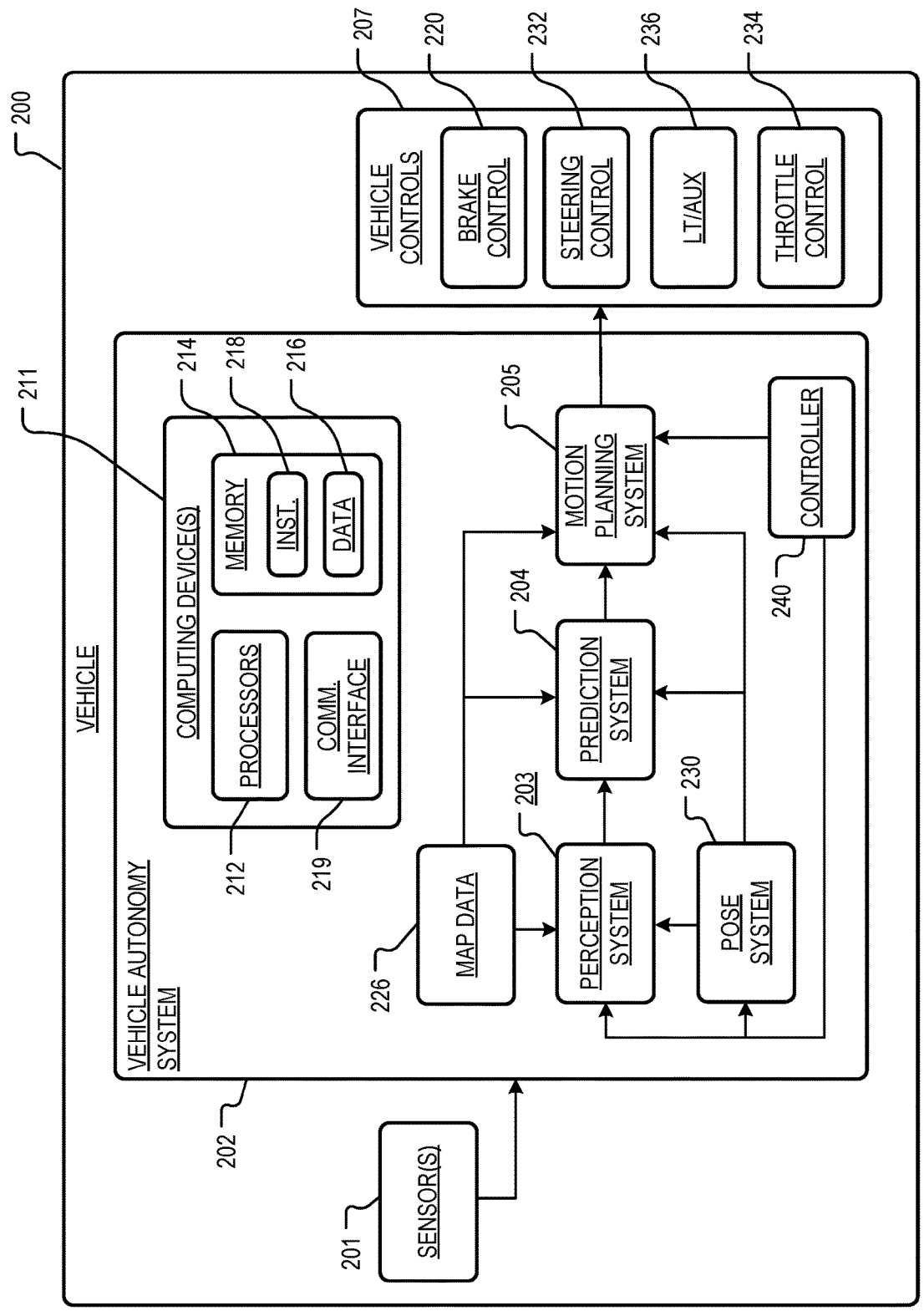
FIG. 2 is a diagram showing a control system for a self-driving vehicle or an autonomous vehicle for operating the vehicle without human intervention in a sample embodiment.

FIG. 2 depicts a block diagram of an example vehicle 200 according to example aspects of the present disclosure. Vehicle 200 can be, for example, an autonomous or semi-autonomous vehicle. The vehicle 200 includes one or more sensors 201, a vehicle autonomy system 202, and one or more vehicle controls 207.

The vehicle autonomy system 202 can be engaged to control the vehicle 200 or to assist in controlling the vehicle 200. In particular, the vehicle autonomy system 202 receives sensor data from the one or more sensors 201, attempts to comprehend the environment surrounding the vehicle 200 by performing various processing techniques on data collected by the sensors 201, and generates an appropriate motion path through the environment. The vehicle autonomy system 202 can control the one or more vehicle controls 207 to operate the vehicle 200 according to the motion path.

The vehicle autonomy system 202 includes a perception system 203, a prediction system 204, a motion planning system 205, and a pose system 230 that cooperate to perceive the surrounding environment of the vehicle 200 and to determine a motion plan for controlling the motion of the vehicle 200 accordingly. The pose system 230 may be arranged to operate as described herein.

Various portions of the autonomous vehicle system 202 receive sensor data from the one or more sensors 201. For example, the sensors 201 may include remote-detection sensors as well as motion sensors such as an inertial measurement unit (IMU), one or more encoders, one or more odometers, etc. The sensor data can include information that describes the location of objects within the surrounding environment of the vehicle 200, information that describes the motion of the vehicle, etc.

The sensors 201 may also include one or more remote-detection sensors or sensor systems, such as a LIDAR, a RADAR, one or more cameras, etc. As one example, a LIDAR system of the one or more sensors 201 generates sensor data (e.g., remote-detection sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, a RADAR system of the one or more sensors 201 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the speed of an object.

As yet another example, one or more cameras of the one or more sensors 201 may generate sensor data (e.g., remote-detection sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the one or more sensors 201 can include a positioning system. The positioning system can determine a current position of the vehicle 200. The positioning system can be any device or circuitry for analyzing the position of the vehicle 200. For example, the positioning system can determine a position by using one or more of inertial sensors, a satellite positioning system such as a Global Positioning System (GPS), based on IP address, by using triangulation and/or proximity to network access points or other network components (e.g., cellular towers, Wi-Fi access points, etc.) and/or other suitable techniques. The position of the vehicle 200 can be used by various systems of the vehicle autonomy system 202.

Thus, the one or more sensors 201 can be used to collect sensor data that includes information that describes the location (e.g., in three-dimensional space relative to the vehicle 20) of points that correspond to objects within the surrounding environment of the vehicle 200. In some implementations, the sensors 201 can be located at various different locations on the vehicle 200. As an example, in some implementations, one or more cameras and/or LIDAR sensors can be located in a pod or other structure that is mounted on a roof of the vehicle 200 while one or more RADAR sensors can be located in or behind the front and/or rear bumper(s) or body panel(s) of the vehicle 200. As another example, camera(s) can be located at the front or rear bumper(s) of the vehicle 200 as well. Other locations can be used as well.

The pose system 230 receives some or all of the sensor data from sensors 201 and generates vehicle poses for the vehicle 200. A vehicle pose describes the position and attitude of the vehicle. The position of the vehicle 200 is a point in a three-dimensional space. In some examples, the position is described by values for a set of Cartesian coordinates, although any other suitable coordinate system may be used. The attitude of the vehicle 200 generally describes the way in which the vehicle 200 is oriented at its position. In some examples, attitude is described by a yaw about the vertical axis, a pitch about a first horizontal axis and a roll about a second horizontal axis. In some examples, the pose system 230 generates vehicle poses periodically (e.g., every second, every half second, etc.). The pose system appends time stamps to vehicle poses, where the time stamp for a pose indicates the point in time that is described by the pose. The pose system 230 generates vehicle poses by comparing sensor data to map data 226 describing the surrounding environment of the vehicle 200. The pose system 230, in some examples, comprises one or more localizers and a pose filter. Localizers generate pose estimates based on remote-sensing data. The pose filter generates vehicle poses, for example, based on pose estimates generated by one or more localizers and on motion sensor data, for example, from an inertial measurement unit (IMU), odometers, other encoders, etc.

The perception system 203 detects objects in the surrounding environment of the vehicle 200 based on sensor data, map data 226 and/or vehicle poses provided by the pose system 230. Map data 226, for example, may provide detailed information about the surrounding environment of the vehicle 200. The map data 226 can provide information regarding: the identity and location of different roadways, segments of roadways, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway; traffic control data (e.g., the location and instructions of signage, traffic lights, or other traffic control devices); and/or any other map data that provides information that assists the vehicle autonomy system 202 in comprehending and perceiving its surrounding environment and its relationship thereto. A roadway may be a place where the vehicle can drive and may include, for example, a road, a street, a highway, a lane, a parking lot, a driveway, etc. The perception system 203 may utilize vehicle poses provided by the pose system 230 to place the vehicle 200 within the map data and thereby predict which objects should be in the vehicle's surrounding environment.

In some examples, the perception system 203 determines state data for one or more of the objects in the surrounding environment of the vehicle 200. State data may describe a current state of an object (also referred to as features of the object). The state data for each object describes, for example, an estimate of the object's: current location (also referred to as position); current speed (also referred to as velocity); acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 200; minimum path to interaction with the vehicle 200; minimum time duration to interaction with the vehicle 200; and/or other state information.

In some implementations, the perception system 203 can determine state data for each object over a number of iterations. In particular, the perception system 203 can update the state data for each object at each iteration. Thus, the perception system 203 can detect and track objects, such as vehicles, that are proximate to the vehicle 200 over time.

The prediction system 204 is configured to predict one or more future positions for an object or objects in the environment surrounding the vehicle 200 (e.g., an object or objects detected by the perception system 203). The prediction system 204 can generate prediction data associated with one or more of the objects detected by the perception system 203. In some examples, the prediction system 204 generates prediction data describing each of the respective objects detected by the perspective system 204.

Prediction data for an object can be indicative of one or more predicted future locations of the object. For example, the prediction system 204 may predict where the object will be located within the next 5 seconds, 20 seconds, 200 seconds, etc. Prediction data for an object may indicate a predicted trajectory (e.g., predicted path) for the object within the surrounding environment of the vehicle 200. For example, the predicted trajectory (e.g., path) can indicate a path along which the respective object is predicted to travel over time (and/or the speed at which the object is predicted to travel along the predicted path). The prediction system 204 generates prediction data for an object, for example, based on state data generated by the perception system 203. In some examples, the prediction system 204 also considers one or more vehicle poses generated by the pose system 230 and/or map data 226.

In some examples, the prediction system 204 uses state data indicative of an object type or classification to predict a trajectory for the object. As an example, the prediction system 204 can use state data provided by the perception system 203 to determine that particular object (e.g., an object classified as a vehicle) approaching an intersection and maneuvering into a left-turn lane intends to turn left. In such a situation, the prediction system 204 can predict a trajectory (e.g., path) corresponding to a left-turn for the vehicle such that the vehicle turns left at the intersection. Similarly, the prediction system 204 can determine predicted trajectories for other objects, such as bicycles, pedestrians, parked vehicles, etc. The prediction system 204 can provide the predicted trajectories associated with the object(s) to the motion planning system 205.

In some implementations, the prediction system 204 is a goal-oriented prediction system 204 that generates one or more potential goals, selects one or more of the most likely potential goals, and develops one or more trajectories by which the object can achieve the one or more selected goals. For example, the prediction system 204 can include a scenario generation system that generates and/or scores the one or more goals for an object and a scenario development system that determines the one or more trajectories by which the object can achieve the goals. In some implementations, the prediction system 204 can include a machine-learned goal-scoring model, a machine-learned trajectory development model, and/or other machine-learned models.

The motion planning system 205 determines a motion plan for the vehicle 200 based at least in part on the predicted trajectories associated with the objects within the surrounding environment of the vehicle, the state data for the objects provided by the perception system 203, vehicle poses provided by the pose system 230, and/or map data 226. Stated differently, given information about the current locations of objects and/or predicted trajectories of objects within the surrounding environment of the vehicle 20, the motion planning system 205 can determine a motion plan for the vehicle 200 that best navigates the vehicle 200 relative to the objects at such locations and their predicted trajectories on acceptable roadways.

In some implementations, the motion planning system 205 can evaluate one or more cost functions and/or one or more reward functions for each of one or more candidate motion plans for the vehicle 200. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 205 can determine a total cost (e.g., a sum of the cost(s) and/or reward(s) provided by the cost function(s) and/or reward function(s)) of adhering to a particular candidate pathway. The motion planning system 205 can select or determine a motion plan for the vehicle 200 based at least in part on the cost function(s) and the reward function(s). For example, the motion plan that minimizes the total cost can be selected or otherwise determined. The motion plan can be, for example, a path along which the vehicle 200 will travel in one or more forthcoming time periods. In some examples, the motion plan also includes a speed path and/or an acceleration path for the vehicle 200. In some implementations, the motion planning system 205 can be configured to iteratively update the motion plan for the vehicle 200 as new sensor data is obtained from one or more sensors 201. For example, as new sensor data is obtained from one or more sensors 201, the sensor data can be analyzed by the perception system 203, the prediction system 204, and the motion planning system 205 to determine the motion plan.

Each of the perception system 203, the prediction system 204, the motion planning system 205, and the pose system, can be included in or otherwise a part of a vehicle autonomy system configured to determine a motion plan based at least in part on data obtained from one or more sensors 201. For example, data obtained by one or more sensors 201 can be analyzed by each of the perception system 203, the prediction system 204, and the motion planning system 205 in a consecutive fashion in order to develop the motion plan. While FIG. 2 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

The motion planning system 205 can provide the motion plan to one or more vehicle controllers 207 to execute the motion plan. For example, the one or more vehicle controllers 207 can include a throttle controller 234, a brake controller 220, a steering controller 232, a lighting/auxiliary controller 236, and/or other controllers, each of which is in communication with one or more vehicle control interfaces to control the motion of the vehicle 200.

The vehicle controllers 207 can include a brake controller 220. The brake controller 220 is configured to receive all or part of the motion plan and generate a braking command that applies (or does not apply) the vehicle brakes. For example, the brake controller 220 may send a command to a braking interface, such as the braking interface 112 of FIG. 1. In some examples, the brake controller 220 includes a primary system and a secondary system. The primary system may receive braking commands and, in response, brake the vehicle 200. The secondary system may be configured to determine a failure of the primary system to brake the vehicle 200 in response to receiving the braking command.

A steering controller 232 is configured to receive all or part of the motion plan and generate a steering command. The steering command is provided to a steering interface, such as the steering interface 110 of FIG. 1, to provide a steering input to steer the vehicle 200. A lighting/auxiliary controller 236 may receive a lighting or auxiliary command. In response, the lighting/auxiliary controller 236 may control a lighting and/or auxiliary system of the vehicle 200. Controlling a lighting system may include, for example, turning on, turning off, or otherwise modulating headlights, parking lights, running lights, etc. Controlling an auxiliary system may include, for example, modulating windshield wipers, a defroster, etc. A throttle controller 234 is configured to receive all or part of the motion plan and generate a throttle command. The throttle command is provided to a throttle interface, such as the throttle interface 114 of FIG. 1, to control the engine or other propulsion system of the vehicle 200.

The vehicle autonomy system 202 includes one or more computing devices, such as the computing device 211, which may implement all or parts of the perception system 203, the prediction system 204, the motion planning system

205 and/or the pose system 230. The example computing device 211 can include one or more processors 212 and one or more memory devices (collectively referred to as memory) 214. The one or more processors 212 can be any suitable processing device (e.g., a processor core, a microprocessor, an Application Specific Integrated Circuit (ASIC), a Field Programmable Gate Array (FPGA), a microcontroller, etc.) and can be one processor or a plurality of processors that are operatively connected. The memory 214 can include one or more non-transitory computer-readable storage mediums, such as Random-Access Memory (RAM), Read Only Memory (ROM), Electrically Erasable Programmable Read Only Memory (EEPROM), Erasable Programmable Read Only Memory (EPROM), flash memory devices, magnetic disks, etc., and combinations thereof. The memory 214 can store data 216 and instructions 218 which can be executed by the processor 212 to cause the vehicle autonomy system 202 to perform operations. The one or more computing devices 211 can also include a communication interface 219, which can allow the one or more computing devices 211 to communicate with other components of the vehicle 200 or external computing systems, such as via one or more wired or wireless networks.

Dual Output Power System

In sample embodiments, the dual output power system architecture described herein is applied to an autonomous or semi-autonomous vehicle such as that described above having an AV stack that is powered by one or both power systems. The 48-V output system is becoming increasingly desirable as AV systems require more and more onboard power. In the case where the AV stack is powered by both power systems, one power system would provide redundancy for the other power system in the event of failure. Such systems will be described below with respect to FIG. 3 and FIG. 4.

Figure 3:
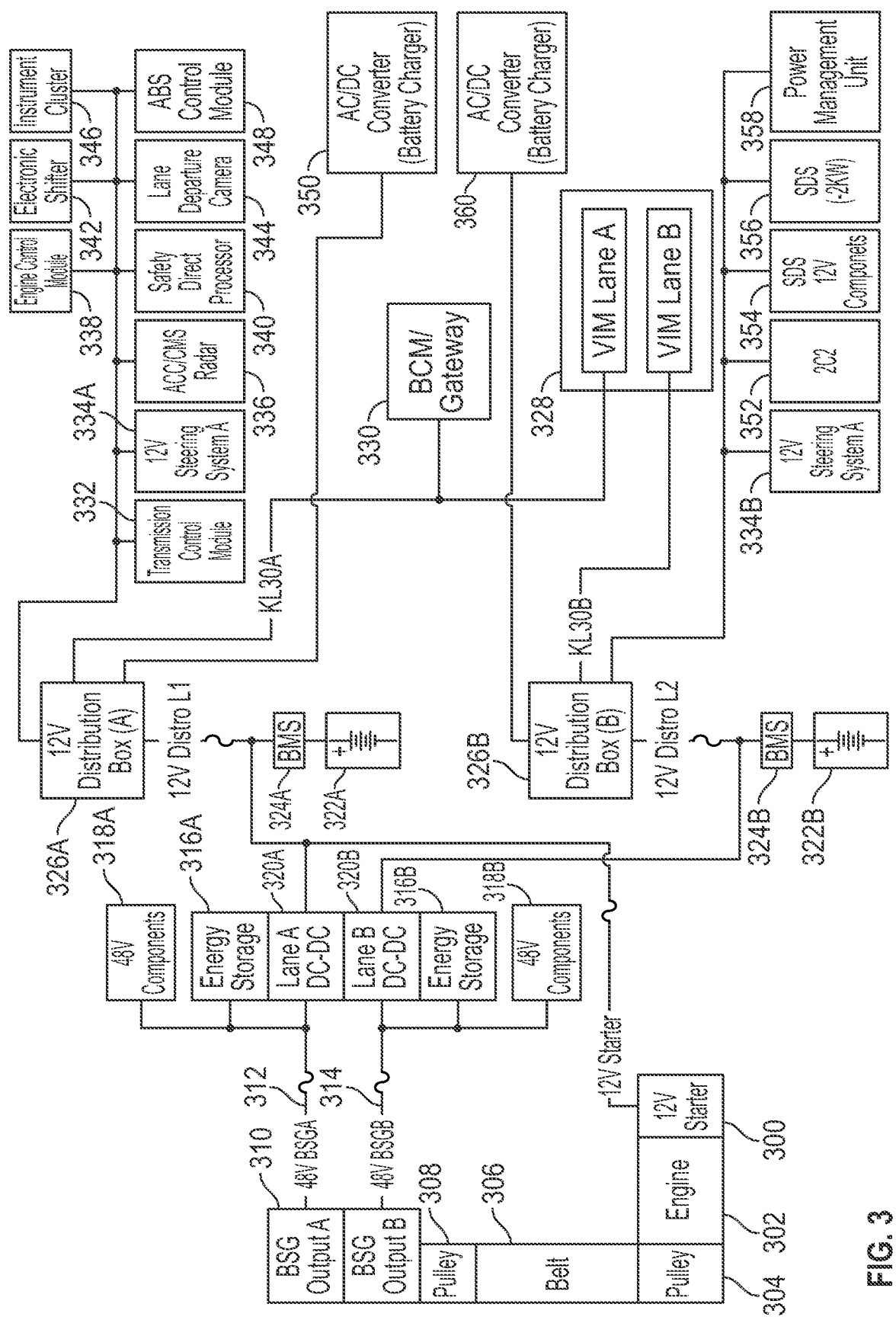
FIG. 3 is a diagram illustrating a two-lane dual output power system adapted for use with a dual output belt-driven starter generator (BSG) including bi-directional power converters that are either two mechanical devices or electronically isolated electronic devices in a sample embodiment.

FIG. 3 illustrates a two-lane dual output power system adapted for use with a dual output belt-driven starter generator (BSG) including bi-directional power converters that are either two mechanical devices or electronically isolated electronic devices. It will be appreciated by those skilled in the art that one or both BSG outputs may be replaced by an alternator, though alternators typically operate at lower voltages. In this embodiment, two lanes of 12-V output are provided completely separately from the two lanes of 48-V output. As illustrated, a 12-V starter 300 starts engine 302 using a charge provided by 12-V battery 322A. The engine 302 may be any engine including an electric engine, a diesel engine, or an internal combustion engine. Hybrid powertrains, specifically Plug-In Hybrid Electric Vehicle (PHEV) powertrains, have a high capacity high voltage battery. Conversion of power from the PHEV/EV battery via a DC-DC converter would be more efficient. Those skilled in the art will appreciate that it is feasible to utilize the BSG approach with a PHEV (not pure EV).

The engine 302 drives a pulley 304 that, in turn, drives belt 306 to turn pulley 308. The pulley 308, in turn, drives a dual output BSG 310 having electrically isolated outputs A 312 and B 314. In a sample embodiment, the outputs A 312 and B 314 of BSG 310 are 48-V. The respective 48-V outputs 312 and 314 may be stored in energy storage devices 316A and/or 316B and may be used to drive 48-V system components 318A and/or 318B. In sample embodiments, the DC-DC converters 320A and 320B convert the 48-V outputs 312 and 314, respectively, to create respective 12-V outputs for Lane A and Lane B as illustrated.

In a sample embodiment, the 12-V output of DC-DC converter 320A in Lane A is provided to a battery 322A through a battery monitoring system (BMS) 324A and to a 12-V distributor, e.g., distribution box 326A. The 12-V output distributed by 12-V distribution box 326A is provided to Vehicle Interface Module (VIM) Lane A of safety control monitor 328 and to Body Control Module (BCM)/Gateway 330. The BCM/Gateway 330, in an example embodiment, serves to monitor and control various electronic accessories, such as power windows, power mirrors, air conditioning, immobilizer system, central locking, and the like.

Another 12-V output of 12-V distribution box 326A is used to power the autonomous or semi-autonomous vehicle modules such as those described above with respect to FIG. 1 and FIG. 2 including transmission control module 332, 12-V steering system 334A, Adaptive (or Autonomous) Cruise Control (ACC)/Collision Mitigation System (CMS) radar 336, engine control module 338, safety direct processor 340, electronic shifter 342, lane departure camera 344, instrument cluster 346, and anti-lock brake system (ABS) control module 348. Of course, 12-V output may also be applied to other vehicle system components not shown in FIG. 3. Finally, an AC-DC converter 350 may be provided as part of a battery charger to supplement the charge to the power levels and current required by the system for storage in battery 322A.

In the sample embodiment, the 12-V output of DC-DC converter 320B in Lane B is provided to a battery 322B through a battery monitoring system (BMS) 324B and to a 12-V distributor, e.g., distribution box 326B. The 12-V output distributed by 12-V distribution box 326B is provided to VIM Lane B of safety control monitor 328. Another 12-V output of 12-V distribution box 326B is used to power the 12-V steering system 334B, the pneumatic valve pack used to control the air brakes (2C2) 352, the 12-V AV stack components 354 and 356, and power management unit 358 that starts the system, sequences when the circuits should turn on, and to start up and operate the power components of the AV stack, such as the AV stack described above with respect to FIG. 1 and FIG. 2 that convert remote sensor inputs into vehicle control commands. Of course, 12-V output may also be applied to other AV stack components not shown in FIG. 3. Finally, an AC-DC converter 360 may be provided as part of a battery charger to supplement the charge provided to battery 322B.

It will be appreciated by those skilled in the art that the dual power system shown in FIG. 3 provides two lanes of isolated 48-V output and 12-V output to respectively power 48-V vehicle components as well as the 12-V system components using two 12-V batteries. The AV stack components may be driven by the 48-V output and/or the 12-V output lanes. As explained below with respect to FIG. 4, these 48-V and 12-V outputs may be used to provide redundant power to safety critical components.

Figure 4:
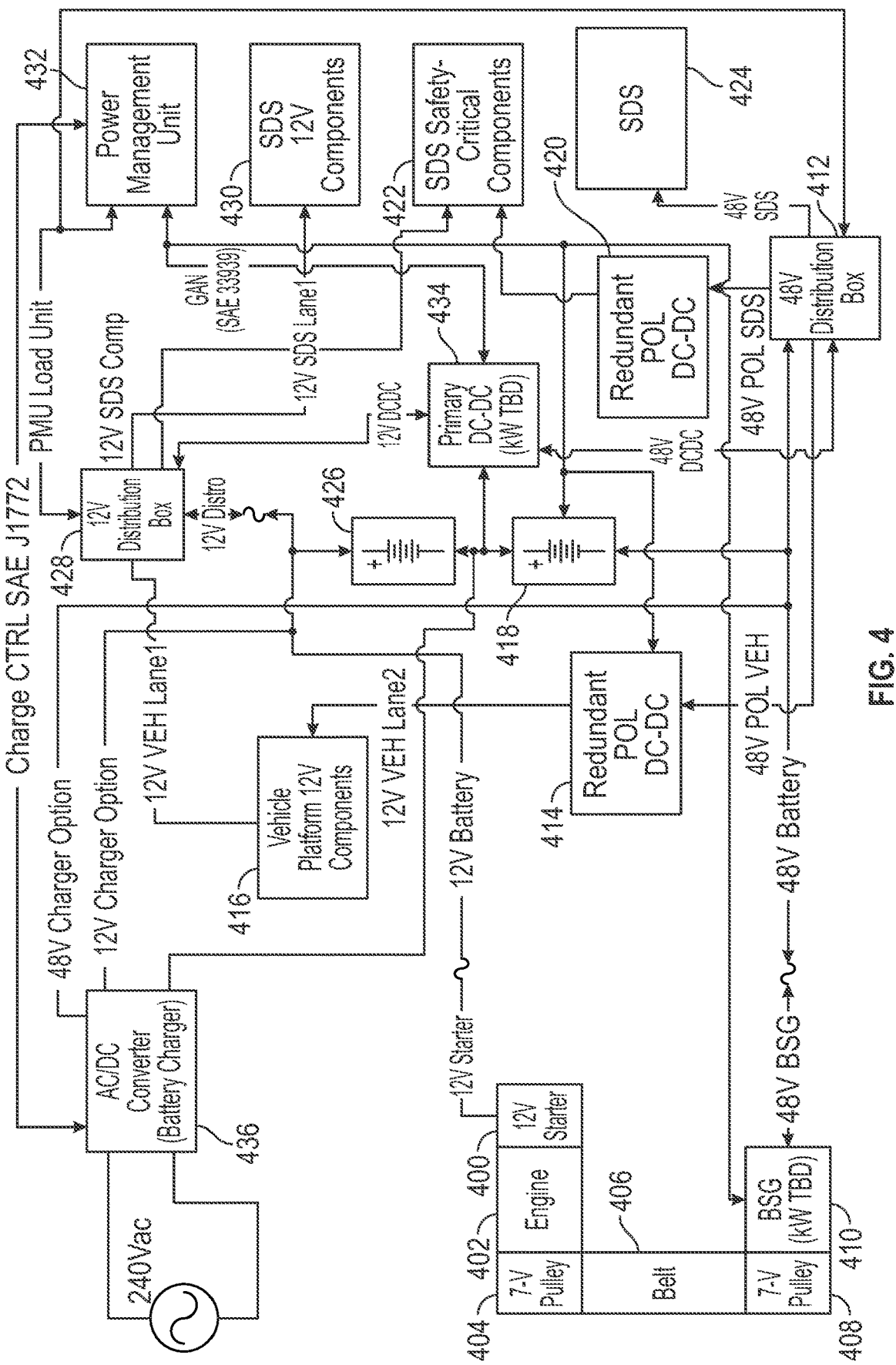
FIG. 4 is a diagram illustrating a dual output power system adapted for use with a belt-driven starter generator (BSG) where the respective power systems provide backup power sources to each other.

FIG. 4 illustrates a second embodiment of a dual output power system adapted for use with a belt-driven starter generator (BSG). In this embodiment, the 12-V and 48-V output systems may provide backup power sources to each other. As illustrated, a 12-V starter 400 receives power from 12-V battery 426 to start engine 402, which may be an electric engine, a diesel engine, or an internal combustion engine. The engine 402 drives a pulley 404 that, in turn, drives belt 406 to turn pulley 408. The pulley 408, in turn, drives a single output BSG 410 having a 48-V output that is provided to a 48-V distributor, e.g., distribution box 412. The 48-V output distributed by 48-V distribution box 412 is provided to redundant point of load (POL) DC-DC converter 414 for conversion to 12-V for driving the vehicle's 12-V components 416. The 48-V output of BSG 410 is also provided to battery 418 for storage. Another 48-V output of 48-V distribution box 412 may also be provided to POL DC-DC converter 420 that is used to provide power to the AV stack safety critical components 422 such as the steering system and the brake system. Yet another 48-V output of 48-V distribution box 412 may be provided to AV stack 424 to provide 48-V output to the 48-V components of the AV stack 424.

The embodiment of FIG. 4 further includes a parallel 12-V output system including 12-V battery 426 that provides the 12-V starting signal to 12-V starter 400. 12-V battery 426 also provides 12-V output to 12-V distributor, e.g., distribution box 428 that, in turn, provides redundant 12-V output to 12-V vehicle components 416. The 12-V distribution box 428 also provides redundant 12-V output to the AV stack safety critical components 422 as well as 12-V output to the AV stack 12-V components 430. A power management unit 432 manages the load on 12-V distribution box 428, 48-V distribution box 412, 48-V battery 418, primary DC-DC converter 434, redundant POL DC-DC converter 420, and BSG 410. In particular, power management unit 432 starts the system, sequences when circuits are turned on, and shuts down the system. Primary 12-V/48-V DC-DC converter 434 is placed between the 12-V and 48V rails from 12-V battery 426 and 48-V battery 418 as illustrated. Optionally, a battery charger 436 provides 48-V and/or 12-V output to the 12-V rail and/or the 48-V rail as illustrated.

It will be appreciated by those skilled in the art that the dual power system shown in FIG. 4 provides redundant 12-V output and 48-V output to the AV stack safety critical components 422 using a 48-V battery and a 12-V battery. It will be appreciated that redundant power at other voltage levels may be provided to the AV stack safety critical components 422 as well as to other onboard components as appropriate.

NUMBERED EXAMPLES

Certain embodiments are described herein as numbered examples 1, 2, 3, etc. These numbered examples are provided as examples only and do not limit the subject technology.

Example 1 is a vehicle comprising electronic systems including an autonomous vehicle stack and a dual output power system for powering the electronic systems of the vehicle. The dual output power system includes at least one battery at a first voltage level for storing energy at the first voltage level, a dual output belt-driven starter generator that is started by a starter receiving power from the at least one battery at the first voltage level and that provides dual outputs at a second voltage level for providing power at the second voltage level to the electronics systems, at least one DC-DC converter that converts the dual outputs at the second voltage level to dual outputs at the first voltage level, and first and second power distributors that distribute power from the at least one battery and the at least one DC-DC converter to the electronic systems.

Example 2 is an example as in Example 1 wherein the first voltage level is a 12-V output and the second voltage level is a 48-V output.

Example 3 is an example as in Example 1 wherein the dual outputs comprise alternators.

Example 4 is an example as in Example 1 wherein the first power distributor provides power to the autonomous vehicle stack and electronic accessories including at least one of power windows, power mirrors, air conditioning, immobilizer system, and central locking.

Example 5 is an example as in Example 4 wherein the second power distributor provides power to a steering system, a pneumatic valve pack used to control air brakes, and to the autonomous vehicle stack.

Example 6 is an example as in Example 5 wherein the second power distributor further provides power to a power management unit that starts the dual output power system, sequences when circuits of the dual output power system should turn on, and starts up and operates power components of the autonomous vehicle stack.

Example 7 is an example as in Example 1 wherein safety critical components of the electronic systems receive redundant power at the first and second voltage levels.

Example 8 is a vehicle comprising electronic systems including an autonomous vehicle stack and a dual output power system for powering the electronic systems of the vehicle. The dual output power system includes a first battery having a first voltage level provided on a first power rail, a second battery having a second voltage level provided on a second power rail, a belt-driven starter generator that is started by a starter receiving power from the first battery at the first voltage level and provides an output at the second voltage level for providing power at the second voltage level to the electronic systems, a first DC-DC converter that converts the output of the belt-driven starter generator to the first voltage level for powering the electronic systems of the vehicle, a second DC-DC converter that provides voltage conversion between the first and second power rails, a first power distributor that distributes power from the first power rail to the electronic systems, and a second power distributor that distributes power from the second power rail to the electronic systems. In sample embodiments, the safety critical components of the electronic systems receive redundant power from the first power distributor and the first DC-DC converter.

Example 9 is an example as in Example 8 wherein the dual output power system further comprises a power management unit that starts components of the dual output power system, sequences when the components are turned on, and shuts down the dual output power system.

Example 10 is an example as in Example 8 wherein the first voltage level is a 12-V output and the second voltage level is a 48-V output.

Example 11 is a method of powering electronic systems of a vehicle including an autonomous vehicle stack, comprising providing power from at least one battery at a first voltage level to a starter of a belt-driven starter generator, providing at least one output of the belt-driven starter generator at a second voltage level to the electronic systems, DC-DC converting, using at least one DC-DC converter, the at least one output at the second voltage level to at least one output at the first voltage level, and distributing power at the first voltage level from the at least one battery and the at least one DC-DC converter to the electronic systems.

Example 12 is an example as in Example 11 wherein the first voltage level is a 12-V output and the second voltage level is a 48-V output.

Example 13 is an example as in Example 11 further comprising providing at least one output of the belt-driven starter generator to at least one alternator.

Example 14 is an example as in Example 11 wherein distributing power at the first voltage level comprises a first power distributor providing power to the autonomous vehicle stack and to electronic accessories including at least one of power windows, power mirrors, air conditioning, immobilizer system, and central locking.

Example 15 is an example as in Example 14 wherein distributing power at the first voltage level comprises a second power distributor providing power to a steering system, a pneumatic valve pack used to control air brakes, and to the autonomous vehicle stack.

Example 16 is an example as in Example 15 wherein distributing power at the first voltage level further comprises the second power distributor providing power to a power management unit that starts a power system for the vehicle, sequences when circuits of the power system should turn on, and starts up and operates power components of the autonomous vehicle stack.

Example 17 is an example as in Example 11 further comprising providing redundant power at the first and second voltage levels to safety critical components of the electronic systems.

Example 18 is an example as in Example 11 further comprising providing power from the at least one battery at the first voltage level to a first power rail, providing power at the second voltage level to a second power rail, and DC-DC converting voltage between the first and second power rails.

Example 19 is an example as in Example 18 further comprising a first power distributor distributing power from the first power rail to the electronic systems and a second power distributor distributing power from the second power rail to the electronic systems, wherein safety critical components of the electronic systems receive redundant power from the first power rail and the second power rail.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A vehicle comprising:
electronic systems including an autonomous vehicle stack;
a dual output power system for powering the electronic systems of the vehicle, comprising:
a first battery having a first voltage level provided on a first power rail,
a second battery having a second voltage level provided on a second power rail,
a belt-driven starter generator that is started by a starter receiving power from the first battery at the first voltage level and provides an output at the second voltage level for providing power at the second voltage level to the electronic systems,
a first DC-DC converter that converts the output of the belt-driven starter generator to the first voltage level for powering the electronic systems of the vehicle,
a second DC-DC converter that converts between the first and second power rails,
a first power distributor that distributes power from the first power rail to the electronic systems, and
a second power distributor that distributes power from the second power rail to the electronic systems,
wherein safety critical components of the electronic systems receive redundant power from the first power distributor and the first DC-DC converter.

2. The vehicle of claim 1, wherein the dual output power system further comprises a power management unit that starts components of the dual output power system, sequences when the components are turned on, and shuts down the dual output power system.

3. The vehicle of claim 1, wherein the first voltage level is a 12-V output and the second voltage level is a 48-V output.

4. The vehicle of claim 1, wherein at least one output of the belt-driven starter generator is provided to an alternator.

5. The vehicle of claim 1, the first power distributer being configured to provide power to the autonomous vehicle stack.

6. The vehicle of claim 1, the first power distributer being configured to provide power to at least one of power windows, power mirrors, air conditioning, immobilizer system, or central locking of the vehicle.

7. The vehicle of claim 1, the second power distributor being configured to provide power to a steering system, a pneumatic valve pack used to control air brakes.

8. The vehicle of claim 1, the second power distributor being configured to provide power to the autonomous vehicle stack.

9. The vehicle of claim 1, the second power distributor being configured to provide power to a power management unit, the power management unit being configured to perform operations comprising:
starting a power system for the vehicle;
sequencing when circuits of the power system turn on; and
starting up and operating power components of the autonomous vehicle stack.

10. The vehicle of claim 1, further comprising at least one battery coupled to provide power at the first voltage level to the first power rail.

11. A method of powering electronic systems of a vehicle including an autonomous vehicle stack, comprising:
- providing power from a first battery at a first voltage level to a starter of a belt-driven starter generator, the first voltage level being provided on a first power rail;
- providing at least one output of the belt-driven starter generator at a second voltage level to the electronic systems, the second voltage level being provided on a second power rail;
- DC-DC converting, using a first DC-DC converter, the at least one output at the second voltage level to at least one output at the first voltage level;
- DC-DC converting, using a second DC-DC converter, between the first power rail and the second power rail;
- distributing, using a first power distributor, power from the first power rail to the electronic systems;
- distributing, using a second power distributor, power from the second power rail to the electronic systems; and
- providing redundant power from the first power distributor and the first DC-DC converter to at least one safety critical component of the electronic systems.

12. The method of claim 11, wherein the first voltage level is a 12-V output and the second voltage level is a 48-V output.

13. The method of claim 11, further comprising providing at least one output of the belt-driven starter generator to at least one alternator.

14. The method of claim 11, further comprising providing power, using the first power distributor, to the autonomous vehicle stack and to electronic accessories including at least one of power windows, power mirrors, air conditioning, immobilizer system, or central locking.

15. The method of claim 14, further comprising providing power, using the second power distributor, to a steering system, a pneumatic valve pack used to control air brakes, and to the autonomous vehicle stack.

16. The method of claim 15, further comprising providing power, using the second power distributor, to a power management unit that starts a power system for the vehicle, sequences when circuits of the power system should turn on, and starts up and operates power components of the autonomous vehicle stack.

17. The method of claim 11, further comprising providing redundant power at the first and second voltage levels to safety critical components of the electronic systems.

18. The method of claim 11, further comprising providing power from at least one battery at the first voltage level to a first power rail.

19. The method of claim 18, further comprising the first power distributor distributing power from the first power rail to the electronic systems and a second power distributor distributing power from the second power rail to the electronic systems.

* * * * *

UNITED STATES PATENT AND TRADEMARK OFFICE
CERTIFICATE OF CORRECTION

| | | |
|---|---|---|
| PATENT NO. | : 11,495,964 B2 | Page 1 of 1 |
| APPLICATION NO. | : 16/114985 | |
| DATED | : November 8, 2022 | |
| INVENTOR(S) | : Thomas Lawrence Smith | |

It is certified that error appears in the above-identified patent and that said Letters Patent is hereby corrected as shown below:

In the Claims

In Column 16, Line 46, in Claim 5, delete "distributer" and insert --distributor-- therefor In Column 16, Line 49, in Claim 6, delete "distributer" and insert --distributor-- therefor Signed and Sealed this
Seventeenth Day of October, 2023

Katherine Kelly Vidal
*Director of the United States Patent and Trademark Office*